(12) United States Patent
Nemeth (10) Patent No.: US 6,318,656 B1
(45) Date of Patent: Nov. 20, 2001

(54) RECORDING AND/OR REPRODUCING DEVICE HAVING A TAPE PULL-OUT ELEMENT AND HAVING LATCHING MEANS FOR THIS TAPE PULL-OUT ELEMENT

(75) Inventor: Robert Nemeth, Vienna (AT)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/600,006

(22) PCT Filed: Nov. 11, 1999

(86) PCT No.: PCT/EP99/08956

§ 371 Date: Jul. 10, 2000

§ 102(e) Date: Jul. 10, 2000

(87) PCT Pub. No.: WO00/30096

PCT Pub. Date: May 25, 2000

(30) Foreign Application Priority Data

Nov. 12, 1998 (EP) .................................................. 98890336

(51) Int. Cl.[7] .................................................. G03B 1/58
(52) U.S. Cl. .................................... 242/332.4; 242/532.1; 242/532.7
(58) Field of Search ............................ 242/332.4, 332.7, 242/332.8, 532.1, 532.6, 532.7, 582; 360/132

(56) References Cited

U.S. PATENT DOCUMENTS

| 3,664,607 | * | 5/1972 | Trefzger | 242/332.4 |
| 4,330,096 | * | 5/1982 | Bartel et al. | 242/532.1 |
| 4,635,147 | * | 1/1987 | Durand et al. | |
| 5,542,620 | * | 8/1996 | Ohshita | 242/332.4 |
| 6,079,651 | * | 6/2000 | Hamming | 242/332.4 |
| 6,082,652 | * | 7/2000 | Theobald | 242/332.4 |

FOREIGN PATENT DOCUMENTS

WO9844499   10/1998   (WO) ........................... G11B/15/67

* cited by examiner

Primary Examiner—William A. Rivera (57) ABSTRACT

A recording and/or reproducing device. A cassette, which contains a magnetic tape and a coupling pin connected to the magnetic tape, can be loaded into the device. The device includes a pull-out element which can be coupled to the coupling element. The pull-out element can be held in order to be coupled to the coupling element with the aid of a retaining structure and is disengageable by the retaining structure after coupling. A latch is provided by which a disengagement of the pull-out element by the retaining structure can be inhibited or enabled, and the latch is constructed for cooperation with the coupling element. The latching is only enabled to disengage the pull-out element by the retaining structure when the coupling element is correctly coupled to the pull-out element.

4 Claims, 7 Drawing Sheets

RECORDING AND/OR REPRODUCING DEVICE HAVING A TAPE PULL-OUT ELEMENT AND HAVING LATCHING MEANS FOR THIS TAPE PULL-OUT ELEMENT

The invention relates to a recording and/or reproducing device, into which a cassette can be loaded, which cassette comprises a housing and a rotationally drivable supply reel accommodated in the housing and a record carrier in the form of a tape wound onto the reel hub of the supply reel and a coupling element connected to the record carrier in the area of the free end of the record carrier and held in a coupling position, and which comprises a rotationally drivable take-up reel having a reel hub, and which comprises a pull-out element constructed to be coupled to the coupling element, and which comprises retaining means constructed to detachably retain the pull-out element and enabling the pull-out element to be retained in an area in which a coupling to the coupling element can be effected and from which the pull-out element is detachable after coupling to the coupling element, and which comprises controllable latching means which are movable between a latching position and a release position, in which latching position they can inhibit a disengagement of the pull-out element from the retaining means and in which release position they enable the pull-out element to be detached from the retaining means, and which comprises actuating means by which the pull-out element, together with the coupling element coupled thereto, can be moved away from the retaining means and up to the reel hub of the take-up reel, in order to bring into engagement with one another, on the one hand, the reel hub and, on the other hand, the pull-out element and the coupling element coupled thereto.

Such a recording and/or reproducing device of the type defined in the opening paragraph is known, for example from the patent document WO 98/44499 A1. In the known recording and/or reproducing device the retaining means are stationarily mounted in the recording and/or reproducing device and is connected to a wire spring having an offset portion, which spring forms a latching element which precludes a movement of the pull-out element as long as the wire spring forming the latching element is in its latching position. The wire spring can be moved from this latching position into a release position, the wire spring forming the latching element of the known recording and/or reproducing device being moved from its latching position into its release position when the cassette is loaded into the recording and/or reproducing device and is thus brought into its operating position. Since in the known recording and/or reproducing device the wire spring forming the latching element is moved with the aid the cassette, the situation may occur that the cassette moves the latching element although the coupling element in the cassette is not correctly or, in the worst case, not all coupled to the pull-out element. In this situation a movement of the pull-out element towards the take-up reel is possible although the coupling element is not correctly, i.e. unsatisfactorily, or, in the worst case, not all coupled to the pull-out element. This is a problem because it may result in incorrect operation which in the worst case leads to a repair, which is of course undesirable.

It is an object of the invention to preclude the aforementioned problems and to provide an improved recording and/or reproducing device of the type defined in the opening paragraph in a simple manner and using simple means, and in a simple manner, in which a joint movement of the pull-out element and the coupling element coupled thereto is always guaranteed after the pull-out element has been released by the latching means.

According to the invention, in order to achieve this object in a recording and/or reproducing device of the type defined in the opening paragraph, the latching means are constructed and arranged to cooperate with the coupling element, and the latching means only assume their latching position when the coupling element is correctly coupled to the pull-out element.

By taking the measures in accordance with the invention it is achieved in a particularly simple manner that the movement of the pull-out element is enabled only when the coupling element has been coupled to the pull-out element in an absolutely correct manner, thereby precluding malfunctions as a result of an incorrect coupling between the coupling element and the pull-out element.

Further embodiments of a recording and/or reproducing device in accordance with the invention have characteristic features as defined in the subsidiary Claims.

The above-mentioned as well as further aspects of the invention will become apparent from the embodiment described hereinafter by way of example and will be elucidated with reference to this example.

The invention will now be described in more detail with reference to the drawings, which show an embodiment given by way of example but to which the invention is not limited.

Figure 1:
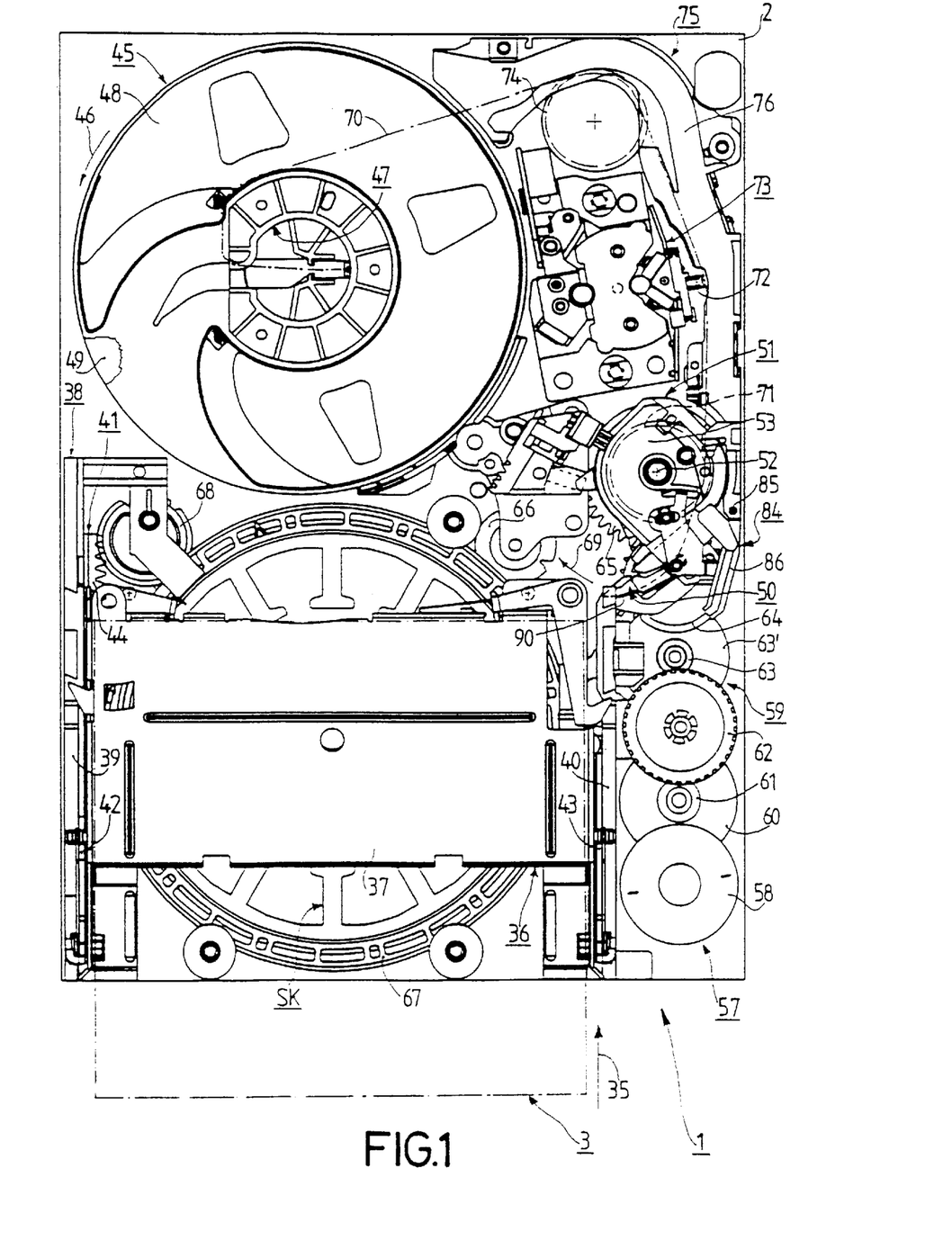
FIG. 1 is a top view of a recording and reproducing device in accordance with a first embodiment of the invention, into which a cassette can be loaded.

FIG. 1 shows a recording and reproducing device 1 in accordance with an embodiment of the invention, hereinafter briefly referred to as the device 1. The device 1 has a chassis 2, shown only diagrammatically, for carrying a multitude of component parts of the device 1. A cassette 3, shown in dash-dot lines in FIG. 1, can be loaded into the device 1. Hereinafter, the construction of the cassette 3 will first be described with reference to FIGS. 2, 3 and 4.

The cassette 3 has a housing 4, which comprises a lower housing half 5 and an upper housing half 6. With the housing halves 5 and 6 joined to one another, i.e. when the housing 4 is closed, the housing 4 has an upper wall 7 and a bottom wall 8, a front side wall 9, a rear side wall 10, a left-hand side wall 11 and a right-hand side wall 12. A grip portion 13 has been provided in the rear area of the upper wall 7 and a grip portion 14 has been provided in the rear area of the bottom wall 8.

In the area of the front side wall 9 a wedge-shaped recess 15 has been provided which, like a positioning portion 16 of the front side wall 9, serves for positioning the cassette 3 when it is moved inside the device 1. In the right-hand side wall 12 the cassette 3 has an access opening 17, which can be closed by means of a shutter 18, but which is shown in its open position in FIG. 2 and in FIG. 3, into which position it is brought automatically when the cassette 3 is loaded into the device 1.

Figure 3:
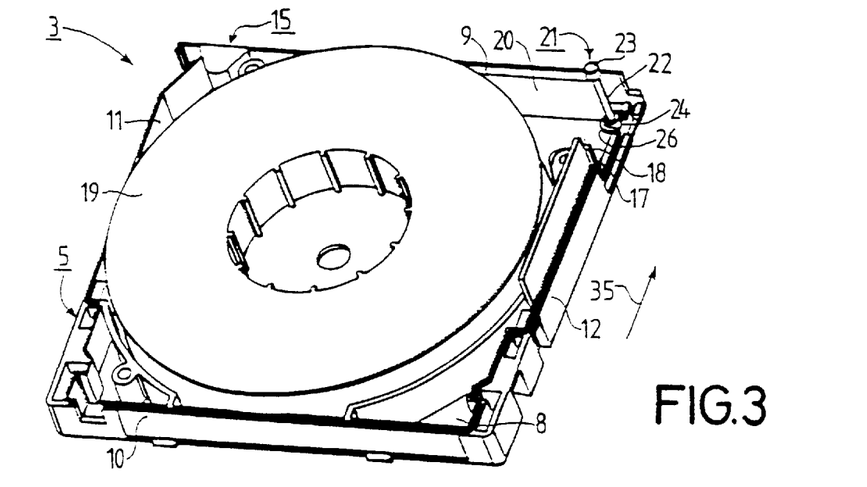
FIG. 3 is an oblique top view showing the cassette of FIG. 2 with the upper half of the housing removed.

The cassette 3 accommodates a rotationally drivable supply reel 19, as can be seen in FIG. 3. The cassette 3 further accommodates a record carrier in the form of a tape, in the present case a magnetic tape 20, wound on the reel hub of the supply reel 19. The cassette 3 further includes a coupling element 21 formed by a coupling pin 21 and connected to the magnetic tape 20 at the free end portion of the magnetic tape 20. The coupling pin 21 has a comparatively thin central portion 22 and an upper first end portion 23 and a lower second end portion 24, both end portions 23 and 24 having a larger diameter than the central portion 22. In the cassette 3 the coupling pin 21 is held in a coupling position, namely by means of two positioning forks 25 and 26 which cooperate with the two end portions 23 and 24 of the coupling pin 21. Furthermore, at least one retaining element, not shown in the Figures, may be provided, which element is movable between a retaining position and a release position and by means of which a mechanism can be actuated, which element is held in its release position by means of the mechanism upon entry of the coupling pin 21 into the cassette 3 and is subsequently moved into its retaining position and engages behind the coupling pin 21. The two end portions 23 and 24 are then held in the positioning forks 25 and 26 by means of the retaining element, as a result of which the coupling position of the coupling pin 21 is accurately defined.

The two housing halves 5 and 6 of the housing 4 are secured to one another by means of three screws 27. The screws 27 are fitted into hollow cylindrical connecting posts 28 and 29, of which hollow cylindrical connecting posts 28 and 29 are visible through the access opening 17 in FIG. 2.

Figure 2:
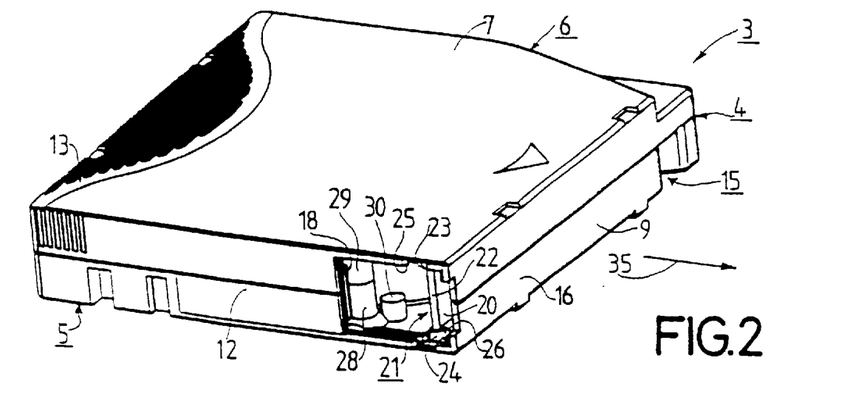
FIG. 2 is an oblique top view of the cassette which can be loaded into the recording and reproducing device of FIG. 1, whose housing comprises two housing halves and which accommodates a record carrier in the form of a magnetic tape, a coupling pin being provided at the free end of the magnetic tape.
Figure 4:
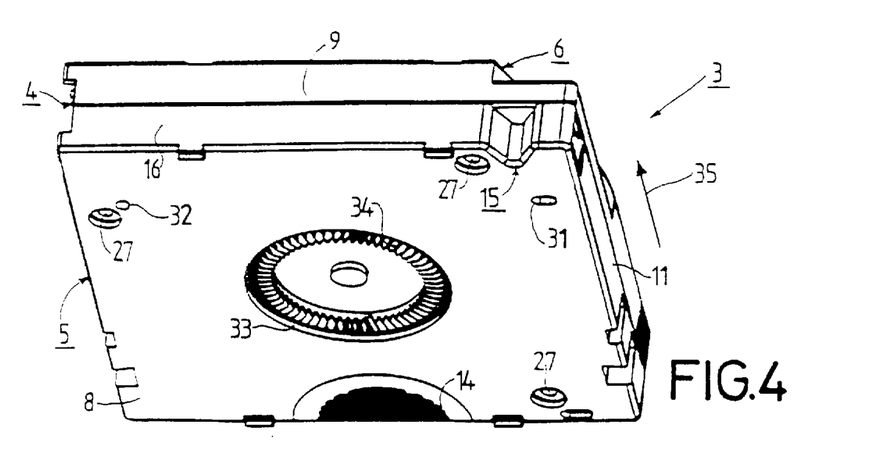
FIG. 4 is an oblique underneath view of the cassette shown in FIGS. 2 and 3.

The cassette 3 further has two positioning posts which project from the bottom wall 8 into the cassette interior and of which a positioning post 30 is visible through the access opening 17 in FIG. 2. Each of the positioning posts 30, as is shown in FIG. 4, has a blind hole, which blind holes serve as final positioning holes 31 and 32 by means of which the cassette 3 can be positioned definitively in the device 1 when the cassette 3 assumes its operating position in the device 1. The first final positioning hole 31 has an elongate cross-sectional shape. The second final positioning hole 32 is of circular cross-section.

In the bottom wall 8 a circular aperture 33 has been formed, through which drive teeth 34 of the supply reel 19 can be accessed by device-mounted reel drive means, with the aid of which the supply reel 19 is rotationally drivable.

It is to be noted that the cassette 3 can be inserted into the device 1 in a direction of insertion indicated by an arrow 35 in the FIGS. 1, 2, 3 and 4. Insertion may also be referred to as introduction or loading.

For holding the cassette 3 the device 1 has holder means 36, hereinafter briefly referred to as the lift 36. The lift 36 is essentially box-shaped and comprises an upper lift wall 37 and two lift side walls which are integral with the upper lift wall and project from the upper lift wall 37 towards the chassis 2, as well as two lift bottom walls which project from the lift side walls 48 and which extend towards one another, which lift bottom walls are spaced at such a distance from one another that there is adequate room for reel drive means between the two lift bottom walls. In a customary manner the reel drive means have drive teeth corresponding to the drive teeth 34 of the supply reel 19. In FIG. 1 the stator lamination assembly SK of a reel drive motor is shown to represent the reel drive means.

Figure 5:
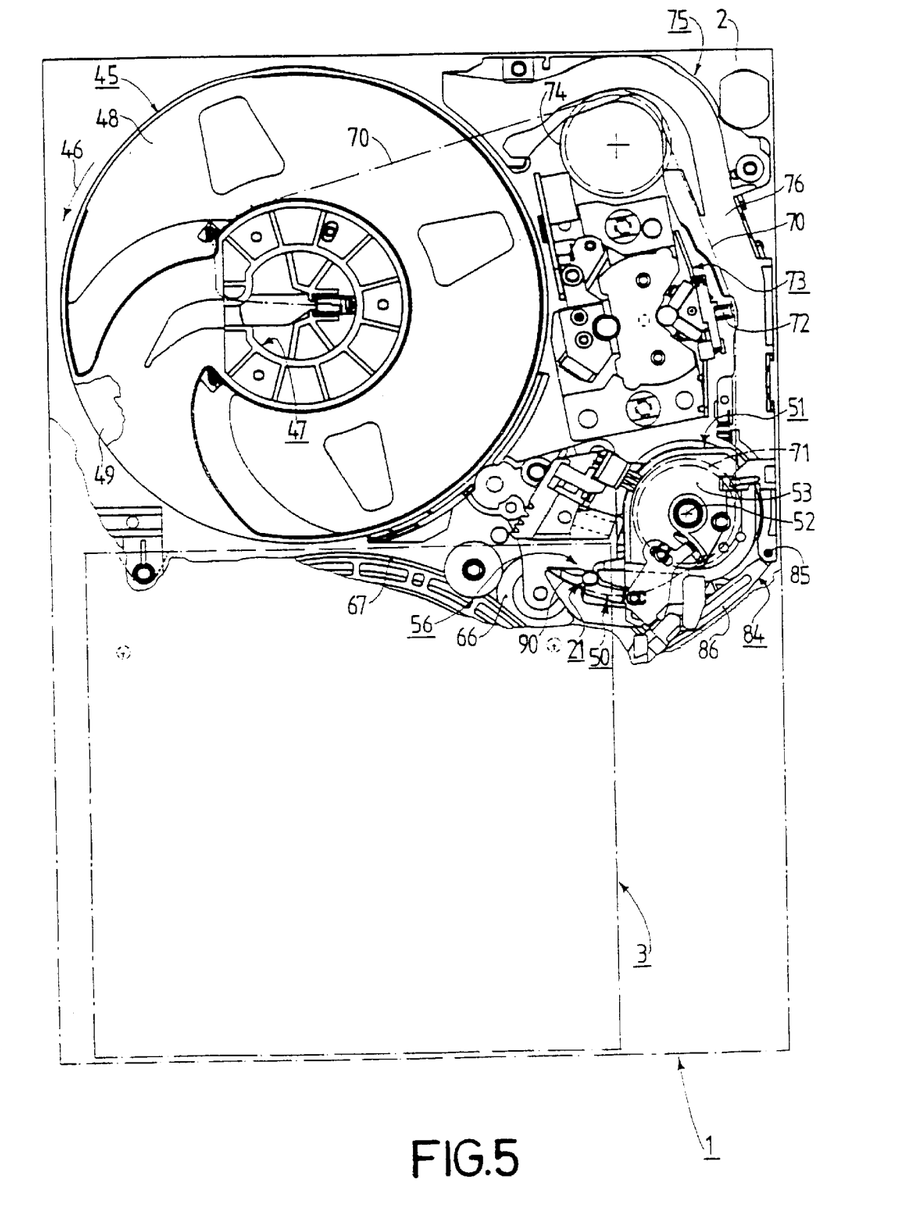
FIG. 5 shows the recording and reproducing device of FIG. 1 in basically the same way as FIG. 1 but only in part, the inserted cassette being in its operating position and a pull-out element of the device being coupled to the coupling pin of the cassette so as to form a pull-out assembly.

The lift 36 is movable between a loading position shown in FIG. 1, in which the cassette 3 can be inserted into the lift 36, and an operating position not shown in the Figures, in which the cassette 3 inserted into the lift 36 occupies its operating position, as shown in FIG. 5. The lift 36 is moved, in a manner known per se, along an L-shaped path of movement, the lift 36 first being moved from its loading position shown in FIG. 1 into its operating position in the direction of insertion 35 and, subsequently, in a direction towards the chassis 2 perpendicularly to the first direction of insertion 35.

In order to obtain this direction of movement the device 1 has guide means 38 including a first guide wall 39 and a second guide wall 40. The two guide walls 39 and 40 have guide channel slots or guide channels, which are engaged by guide pins which project laterally from the lift 36.

The device 1 has actuating means 41 for moving the lift 36. The actuating means 41 include two actuating slides 42 and 43 which are guided so as to be slidable parallel to the direction of insertion 35 and which are each connected to a gear rack, FIG. 1 showing only the gear rack 44 connected to the second actuating slide 42. Each of the actuating slides 42 and 43 has a cam surfaces which are inclined with respect to the plane of the chassis 2, which each cooperate with a cam follower which projects laterally from the lift 36, as a result of which the lift 36 is movable by moving the actuating slides 42 and 43.

The device 1 further includes a take-up reel 45. The take-up reel 45 is rotationally drivable by means of a reel drive motor, not shown. The take-up reel 45 serves for taking up the magnetic tape 20 accommodated in the cassette 3. In order to wind the magnetic tape 20 onto the take-up reel 45 the take-up reel 45 should be driven in the direction indicated by an arrow 46. In the present case the take-up reel 45 comprises a reel hub 47, an upper reel flange 48 which are integral with the reel hub 47, and a lower reel flange 49 which is connected to the reel hub 47 by means of an adhesive joint or by means of an ultrasonic weld.

In order to enable the magnetic tape 20 contained in the cassette 3 to be wound onto the take-up reel 45 the magnetic tape 20 should first be brought to the take-up reel 45 with the aid of the coupling pin 21. For this purpose, the device 1 has a pull-out element 50, whose constructional details are apparent in particular from FIG. 6 and FIG. 12. The pull-out element 50 is adapted to be coupled to the coupling element 21, i.e. to the coupling pin 21.

In order to enable the pull-out element 50 to be coupled to the coupling pin 21, the device 1 is constructed as follows.

Figure 8:
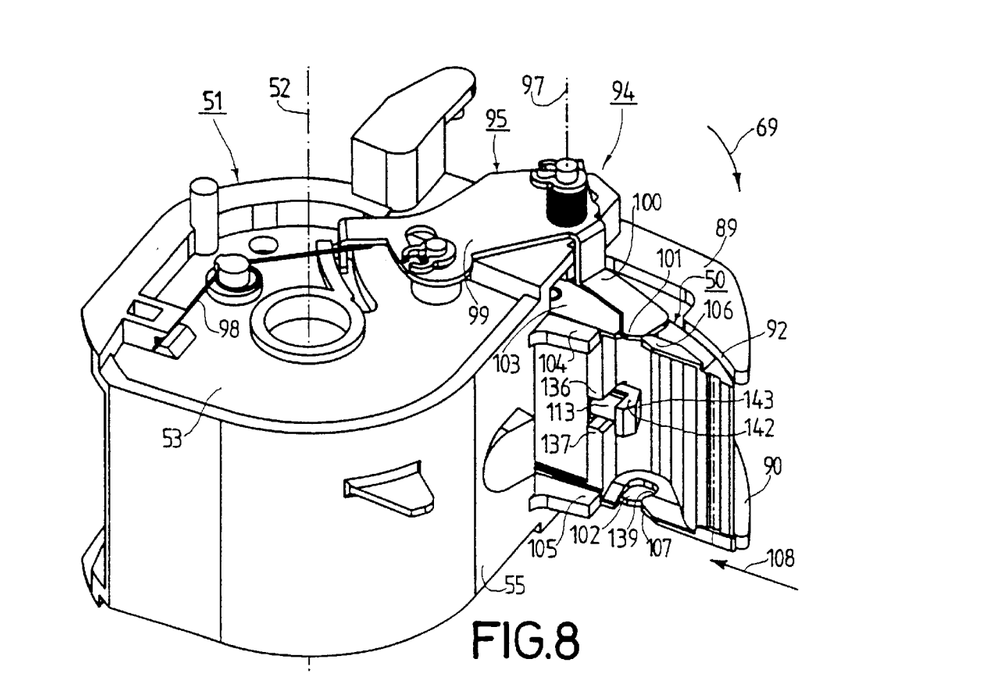
FIG. 8 is an oblique plan view of retaining means for retaining the pull-out element provided in the recording and reproducing device of FIG. 1, the retaining means being in their standby position.
Figure 9:
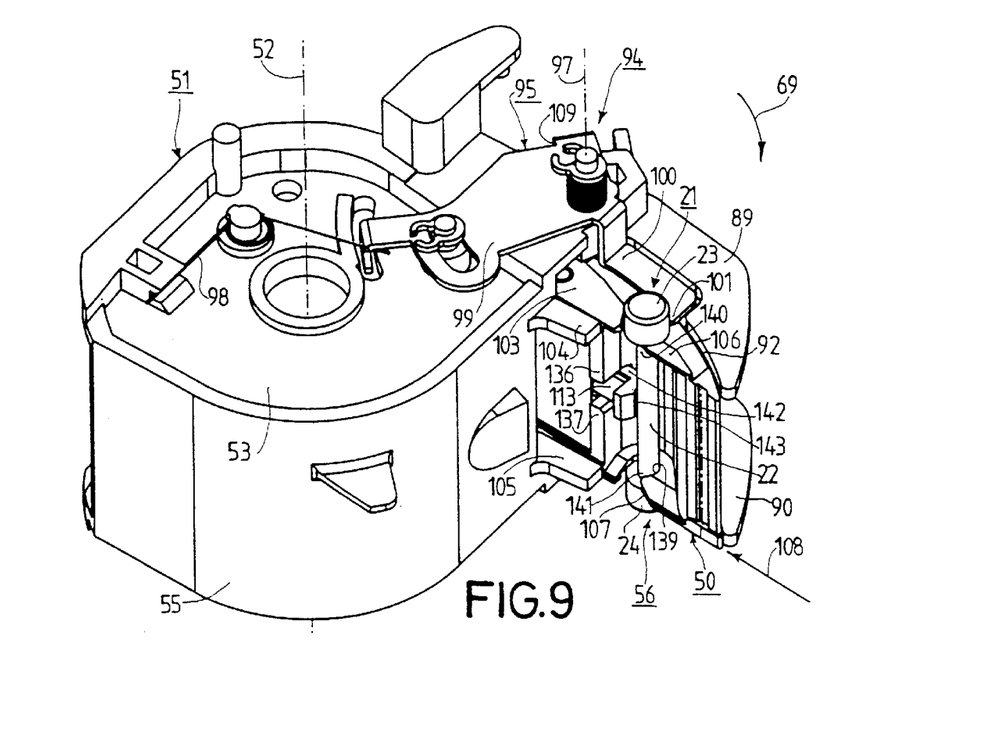
FIG. 9 is an oblique plan view showing the retaining means of FIG. 8, the retaining means being in their operating position and the coupling pin of the cassette of FIGS. 2 to 4 being coupled to the pull-out element which is retained by the retaining means.
Figure 10:
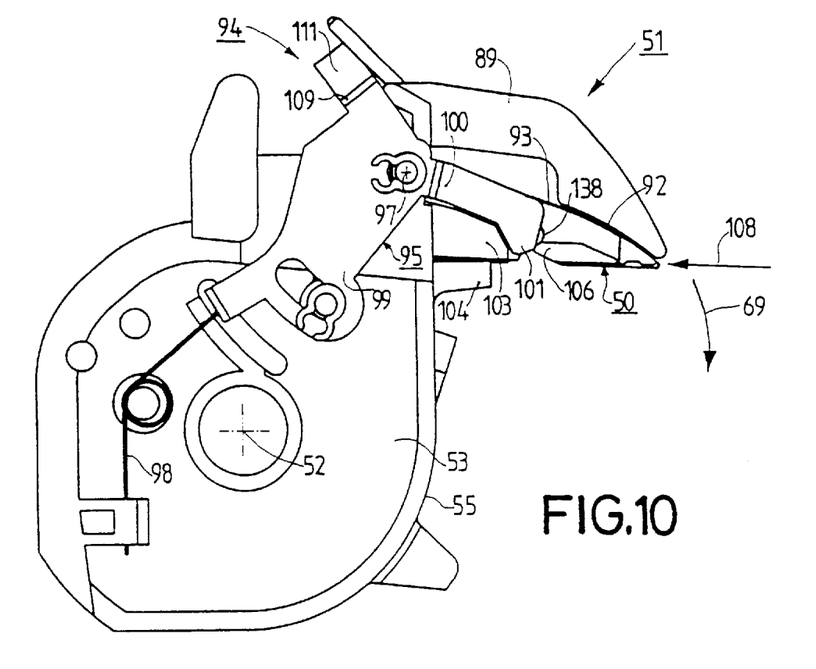
FIG. 10 is a plan view showing the retaining means of FIGS. 8 and 9 in their standby position.
Figure 11:
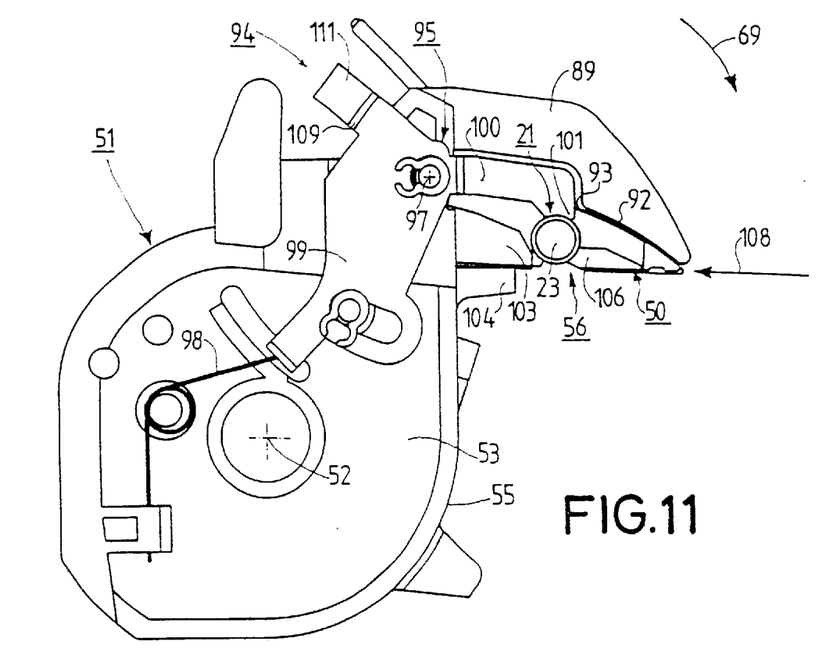
FIG. 11 is a plan view showing the retaining means of FIGS. 8 and 9 in their operating position.

The device 1 includes retaining means 51 adapted to detachably retain the pull-out element 50, which retaining means are movable between a standby position shown in FIGS. 1, 8 and 10 and an operating position shown in FIGS. 5, 9 and 11, a movement of the retaining means 51 into their operating position causing a movement of the pull-out element 50 in a coupling direction 69 and the pull-out element 50 and the coupling pin 21 to be coupled and a movement of the retaining means 51 out of their operating position causing a movement of the pull-out element 50 in a direction opposite to the coupling direction 69 and the pull-out element 50 and the coupling pin 21 to be disengaged.

Figure 7:
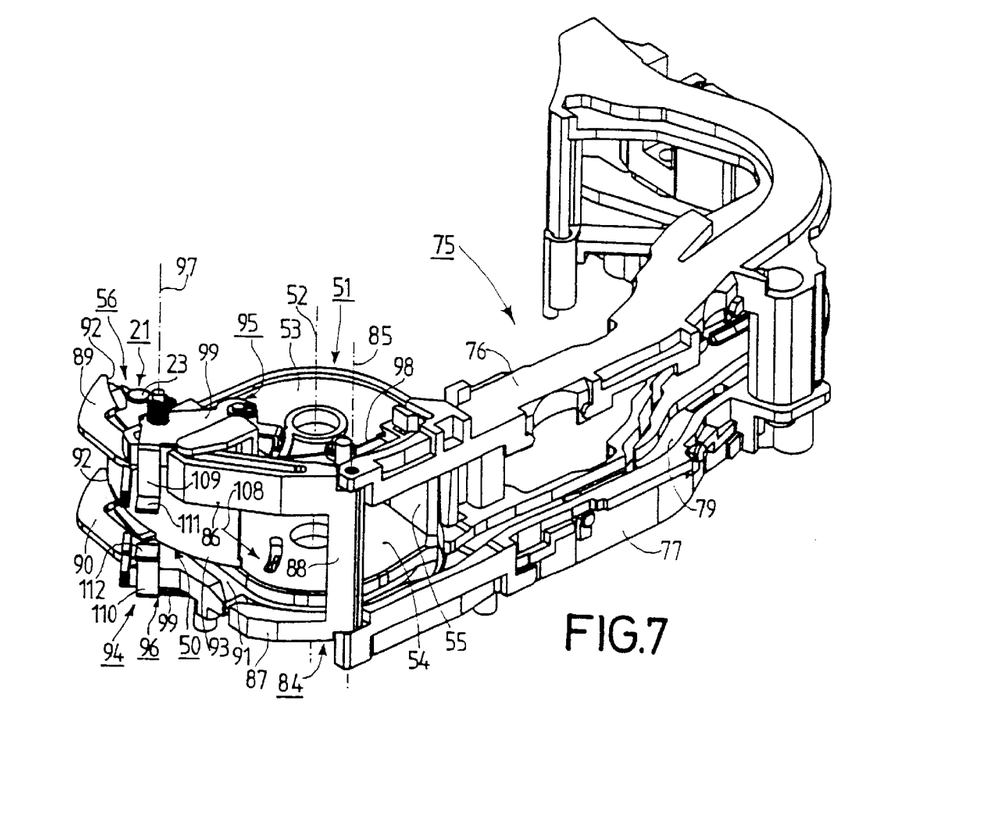
FIG. 7 is an oblique plan view showing guide means by which the pull-out assembly of FIG. 6 can be guided between retaining means and a take-up reel.

In the device 1 the retaining means 51 are mounted so as to be pivotable about a pivotal axis 52. The retaining means 51, which are also shown in FIG. 7 and in particular in FIGS. 8, 9, 10 and 11, are substantially U-shaped and comprise two substantially planar retaining limbs 53 and 54 interconnected by a curved web 55. The pull-out element 50 is retained between the two retaining limbs 53 and 54 and in a manner described in more detail hereinafter it is ensured that the pull-out element 50 is held in a given initial position, i.e. is held in an area in which coupling with the coupling pin 21 is possible and, as a result of this, a pull-out assembly 56 consisting of the pull-out element 50 and the coupling pin 21 coupled to this element can be formed. The pull-out element 50 is shown in this initial position in FIG. 1. Said pull-out assembly 56 is clearly visible particularly. It is to be noted that after the pull-out element 50 has been coupled to the coupling pin 21 the pull-out element 50 together with the coupling pin 21, i.e. the whole pull-out assembly 56, can be detached by the retaining means 51, which will be described in more detail here.

In order to enable both the holder means (lift) 36 and the retaining means 51 to be moved, the device 1 has drive means 57, which include a motor 58 and a gear wheel transmission 59 which is drivable by a motor pinion, not shown. Only some of the gear wheels of the gear wheel transmission 59 are shown, namely a gear wheel 60, a gear wheel 61, a gear wheel 62, a gear wheel 63, a gear wheel 63', a retaining-means drive gear wheel 64, a further gear wheel 65, which is rotatable about the axis 52, a gear wheel 66, which is drivable by the further gear wheel 65 via further gear wheels not shown, as well as a ring-shaped gear wheel 67, which is drivable via gear wheels not shown, and an intermediate gear wheel 68 for direction reversal, which is drivable by the ring-shaped gear wheel 67.

When the cassette 3 is inserted into the lift 36, which is in its loading position shown in FIG. 1, the cassette 3 abuts against a stop of the lift 36 at the end the insertion movement, as a result of which lift 36 performs a small movement in the direction of insertion 35. This small movement of the lift 36 is detected by means of a photoelectric sensor, in response to which the motor 58 of the drive means 57 is switched on via the sensor. As a result of this, the retaining-means drive gear wheel 64 as well as the ring-shaped gear wheel 67 are driven via the gear wheel transmission 59. The ring-shaped gear wheel 67 is directly in driving engagement with the gear rack which is not visible in FIG. 1 and is connected to the second actuating slide 43 and is in driving engagement with the gear rack 44 of the first actuating slide 42 via the intermediate gear wheel 68. As a result, the two gear racks and, consequently, the two actuating slides 42 and 43 are moved in the insertion direction 35 with the aid of the ring-shaped gear wheel 67 and the intermediate gear wheel 68, so that the lift 36 is moved from its loading position shown in FIG. 1 into its operating position, not shown, in which the cassette 3 occupies its operating position shown in FIG. 5. As soon as the lift 36 has reached its operating position the further gear wheel 65 is disengaged from the gear wheel which can be driven by the further gear wheel 65 but which is not shown in FIG. 1, as a result of which the driving engagement with the lift 36 is interrupted.

However, the motor 58 is driven further, as a result of which the retaining-means drive gear wheel 64 is drive further. A rod spring is fastened to the retaining-means drive gear wheel 64 and has a free end which can come into contact with an actuating pin of the retaining means 51, namely after the lift 36 has reached its operating position. Via said rod spring and the actuating pin of the retaining means 51 the retaining means are pivoted in the direction indicated by the arrow 69, i.e. in the coupling direction 69, from their standby position shown in FIG. 1 into their operating position shown in FIG. 5, the pull-out element 50, which is retained by the retaining means 50, then being also moved in the coupling direction 69 and then being coupled to the coupling pin 21 of the cassette 3, as a result of which the pull-out assembly 56 is formed. As soon as the pull-out element 50 has been coupled to the coupling pin 21, this is detected by means of a further photoelectric sensor, after which the motor 58 of the drive means 57 is switched off with the aid of this sensor.

In order to enable the pull-out element 50 and the coupling pin 21, after they have been coupled, i.e. the pull-out assembly 56 thus formed, to be moved away from the retaining means 51 and to be moved up to the reel hub 47 of the take-up reel 45, the device 1 includes actuating means 70. In the device 1 the actuating means 70 are simply formed by a pull-out tape 70, which for the clarity of the drawings is shown as a dash-dot line in FIGS. 1 and 5. The pull-out tape is guided along a tape-transport path which is apparent from the dash-dot line in FIGS. 1 and 5. The tape-transport path is basically defined by a first tape guide roller 71, which is coaxial with the axis 52 and is disposed between the two retaining limbs 53 and 54 of the retaining means 51, by a magnetic head 72, which is supported on actuator means 73 for positioning the magnetic head 72 for the purpose of accurate tracking control, and by a second tape guide roller 74.

The pull-out tape 70 has one end connected to the pull-out element 50 and has its other end connected to the reel hub 47 of the reel hub 45. Thus, by driving the take-up reel 45 in the direction indicated by the arrow 46 the pull-out assembly 56 can be moved away from the retaining means 51 and up to the reel hub 47 of the take-up reel 45 with the aid of the pull-out tape 70 in a simple manner, in order to achieve that, on the one hand, the reel hub 47 and, on the other hand, the pull-out assembly 56 formed by the pull-out element 50 coupled to the coupling pin 21 are brought to each other.

During the movement of the pull-out assembly 56 away from the retaining means 51 and towards the reel hub 47 of the take-up reel 45 and also during the movement in the opposite direction the pull-out assembly 56 should be guided accurately and reliably, particular care being required to ensure that the pull-out assembly 56 is moved without contact past the two tape guide rollers 71 and 74 and, particularly, past the magnetic head 72. For this purpose the device 1 has first guide means 75 connected to the chassis 2 and second guide means which cooperate with the first guide means 75.

Figure 6:
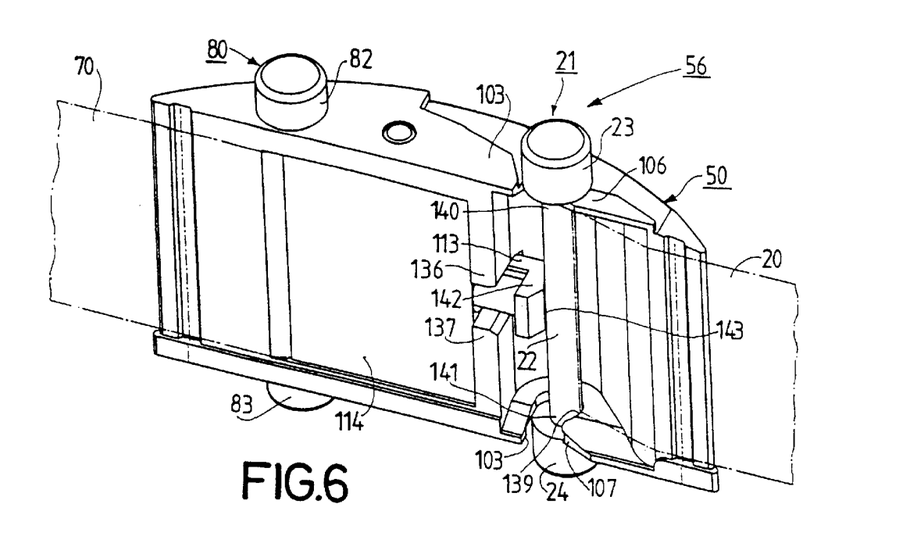
FIG. 6 is an oblique plan view showing the pull-out assembly formed in the recording and reproducing device of FIG. 5.

In the present case the second guide means are advantageously arranged on the coupling pin 21 and are formed by the two end portions 23 and 24 of the coupling pin, which end portions, as is apparent from FIG. 6, project beyond the pull-out element 50 and beyond the magnetic tape 20 in the width direction of the magnetic tape 20. The first guide means 75 connected to the chassis 2 comprise two guide members 76 and 77, which extend essentially adjacent the tape transport path and which, in the width direction of the magnetic tape 20, are spaced apart by a distance larger than the width of magnetic tape 20, and have each been provided with a guide channel 78 and 79, respectively. The first end portion 23 of the coupling pin 21 engages in the first guide channel of the first guide member 76. The second end portion 24 of the coupling pin 21 engages in the second guide channel 79 of the second guide member 77.

In the device 1 the pull-out element 50 in addition comprises third guide means provided on a guide pin 80. For the construction of the guide pin 80 reference is made to FIG. 6 and particularly to FIG. 9. Similarly to the coupling pin 21 the guide pin 80 has a comparatively thin central portion 81 and an upper first end portion 82 and a lower second end portion 83, the two end portions 82 and 83 having a larger diameter than the comparatively thin central portion 81. The diameter of the two end portions 82 and 83 of the guide pin corresponds to the diameter of the two end portions 23 and 24 of the coupling pin 21. The guide pin 80 is made of a metal, namely steel. The third guide means are formed by the two end portions 82 and 83 of the guide pin 80, which like the second guide means, i.e. the two end 23 and 24 of the coupling pin 21, cooperate with the first guide means 75, i.e. with the two guide members 76 and 77, the first end portion 82 of the guide pin 80 engaging in the first guide channel 78 of the first guide member 76 and the second end portion 83 of the guide pin 80 engaging in the second guide channel 79 of the second guide member 77.

As is apparent from FIG. 7, there have been provided guide means 84 which are movable by the two guide members 76 an 77 in the area of the ends of said members which face the retaining means 51. The movable guide means 84 are movable between a rest position shown in FIG. 1 and a guiding position shown in FIGS. 5 and 6. In order to enable the movable guide means 84 to be moved the movable guide means 84 are mounted on the two guide members 76 and 77 so as to be movable about a pivotal axis 85. The movable guide means 84 are substantially U-shaped and have an upper first guide arm 86 and a lower second guide arm 87, which are connected to one another by a web portion 88. The movable guide means 84 are moved in dependence on the movement of the retaining means 51, but this will not be described any further here. By means of the two guide arms 86 and 87 the pull-out assembly 56 can be moved from its initial position shown in FIG. 7 around the retaining means 51 and the first tape guide roller 71 present in the retaining means 51 until the pull-out assembly 56, i.e. the guide pin 80 and the coupling pin 21 reach the two guide channels 78 and 79 in the two guide members 76 and 77. The guide means described hereinbefore guarantee a particularly reliable and accurate movement of the pull-out assembly 56 between the retaining means 51 and the reel hub 47 of the take-up reel 45 without the pull-out assembly 56 coming into contact with the two tape guide rollers 71 and 74 and the magnetic head 72.

In the device 1 it is important that the pull-out element 50 can only be disengaged by the retaining means 51 when the pull-out element 50 and the coupling pin 21 have been coupled to each other correctly because only then it is guaranteed that the pull-out element 50 can be moved back to the retaining means 51 after a disengagement of the pull-out element 50 from the retaining means 51 and a movement of the pull-out element 50 together with the coupling pin 21 coupled to this element 50 towards the take-up reel 45 by the rotation of the take-up reel 19 via the magnetic tape 20 and the coupling pin 21. In order to guarantee that the pull-out element 50 can be disengaged from the retaining means 51 only when the coupling pin 21 has been coupled correctly to the pull-out element 50, the construction described hereinafter is used in the device 1. For this construction reference is made particularly to FIGS. 7, 8, 8, 9, 10 and 11.

In addition to the retaining limbs 53 and 54 interconnected by the web 55 the retaining means 51 comprise two retaining arms 89 and 90 which project laterally from the two retaining limbs 53 and 54. Each of the two retaining arms has a guide channel 91, of which a guide channel 91 is shown in FIG. 7. Each of the two guide channels 91 is engaged by an end portion 82 or 83 of the guide pin 80. In the area of the free end portions of the two retaining arms 89 and 90 the two retaining arms 89 and 90 have circularly arcuate bounding surfaces 92, of which the bounding surface 92 on the retaining arm 89 is visible in FIG. 8. The circular-arc shape of the bounding surfaces 92 corresponds to the circular-arc shape of the curved circumferential surface 93 of the pull-out element 50. In the device 1 controllable latching means 94 are connected to the retaining means 51, which latching means 94 are movable between a latching position shown in FIGS. 1, 8 and 10, in which latching position they can inhibit a disengagement of the pull-out element 50 from the retaining means 51, and a release position shown in FIGS. 5, 9 and 11, in which release position they enable the pull-out element 50 to be detached from the retaining means 51.

In the present case the latching means are constructed and arranged for cooperation with the coupling pin 21 and the latching means 94 comprise two latching levers 95 and 96 which are mounted on the retaining means 51 and which are supported on the retaining means 51 so as to be pivotable about the pivotal axis 97 shown in FIGS. 7 to 11 in the area of the transition between the retaining limbs 53 and 54 and the retaining arms 89 and 90. A two-arm wire spring 98, which acts as a spring means and is fitted on the respective one of the two retaining limbs 53 and 54, cooperates with each of the two latching levers 95 and 96, the Figures showing only the wire spring 98 fitted onto the retaining limb 53. The wire springs urge the two latching levers 95 and 96 towards their latching positions. The two wire springs 98 act each on a first lever arm 99 of each of the two respective latching levers 95 and 96.

The two latching levers 95 and 96 each further comprise an angled second lever arm 100. Each of the two lever arms 100 performs two functions. Each lever arm 100 serves to cooperate with an end portion 140 or 141 of the central portion 22 of the coupling pin 21. For this purpose each lever arm 100 has a substantially wedge-shaped free end portion, 101 and 102, which in the absence of the coupling pin 21 projects into the recess provided in the pull-out element 50 for the coupling pin 21, as is apparent from FIGS. 8 and 10. Each of the two latching levers 95 and 96 acts upon a projection 103 with its second lever arm 100 under the influence of the wire spring 98. Under the influence of the wire spring 98 the projection on the pull-out element 50 is pressed against a respective positioning projection 104 or 105 of the retaining means 51 via the second lever arm 100 of each respective latching lever 95 or 96, thereby partly defining the position of the pull-out element 50 on the retaining means 51.

In addition, the two second lever arms 100 are adapted to cooperate with two latching portions 106 and 107 formed by projections of the pull-out element 50. As is apparent from FIGS. 8 and 10, each of the two latching levers 95 and 96, when in its latching position, faces a latching portion 106 or 107 of the pull-out element 50 with its wedge-shaped end portion 101 or 102 and thereby blocks a movement of the pull-out element 50 in the direction of movement indicated by an arrow 108 in FIGS. 7 to 11, in which direction the pull-out element 50, when coupled to the coupling pin 21, is detachable by the retaining means 51.

With regard to the positioning of the pull-out element 50 on the retaining means 51 it is to be noted that this positioning is effected with the aid of the two second lever arms 100 and with the aid of the guide pin 80. Wire springs 98 urge the two lever arms 100 against the projections 103, the substantially wedge-shaped free end portions 101 and 102 of the second lever arms 100 cooperating both with the projections 103 and with the latching portions 106 and 107, which are likewise formed by projections, which contributes to the positioning of the pull-out element 50 on the retaining means 51, a further contribution to the positioning being obtained in that the end portions 82 and 83 of the guide pin 80 engage in the guide channels 91 in the retaining arms 89 and 90.

When the retaining means 51 are moved in the coupling direction 69 from their standby position into their operating position the pull-out element 50 the pull-out element 50 is moved towards the coupling pin 21 which is in its coupling position defined in the cassette 3. The two end portions 140 and 141 of the central portion 22 of the coupling pin 21 then enter into operative engagement with the free end portions 101 and 102 of the two lever arms 100 of the latching levers 95 and 96, after which the two latching levers 95 and 96 are moved in a direction opposed to the coupling direction 69 from their latching positions shown in FIGS. 8 and 9 into their release positions shown in FIGS. 9 and 11. This movement of the two latching levers 95 and 96 into their release positions proceeds only correctly with the pull-out element 50 coupled to the coupling pin 21. If, owing to whatever circumstances, the coupling pin 21 is coupled correctly to the pull-out element 50 at one end portion only, its other end portion not being coupled correctly, this results in only one of the two latching levers 95 and 96 being moved out of its latching position, as a result of which the free end portion 101 or 102 of the second lever arm 100 of the other one of the two latching levers 95 and 96 cooperates with the latching portion 106 or 107 in that the free end portion 101 or 102 lies opposite the latching portion 106 or 107, which ensures that a movement of the pull-out element 50 in the direction indicated by the arrow 108 is blocked.

The two latching levers 95 and 96 each have a third lever arm, 109 and 110 respectively, which are also angled and which have two end portions 111 and 112 which extend parallel to one another. The two end portions 111 and 112 are adapted to cooperate with a photoelectric sensor, not shown. The photoelectric sensor supplies a control signal only when both latching levers 95 and 96 have been pivoted into their release positions and the end portions 111 and 112 of the third lever arms 109 and 110 have been moved accordingly, which control signal is required in order to enable the drive motor for the take-up reel 45 to be activated so as to drive the take-up reel 45. As soon as driving of the take-up reel 45 begins the pull-out element 50 with the coupling pin 21 coupled thereto, i.e. the pull-out assembly 56, is moved away from the retaining means 51 and towards the take-up reel 45 via the pull-out tape 70.

During a movement of the pull-out assembly 56 between the retaining means 51 and the take-up reel 45 it is very important that the pull-out element 50 and the coupling pin 21 coupled thereto remain securely connected to one another. In order to guarantee this secure connection the construction described hereinafter is used, which construction is apparent from FIGS. 6, 7, 8, 9 and, particularly, 12.

Figure 12:
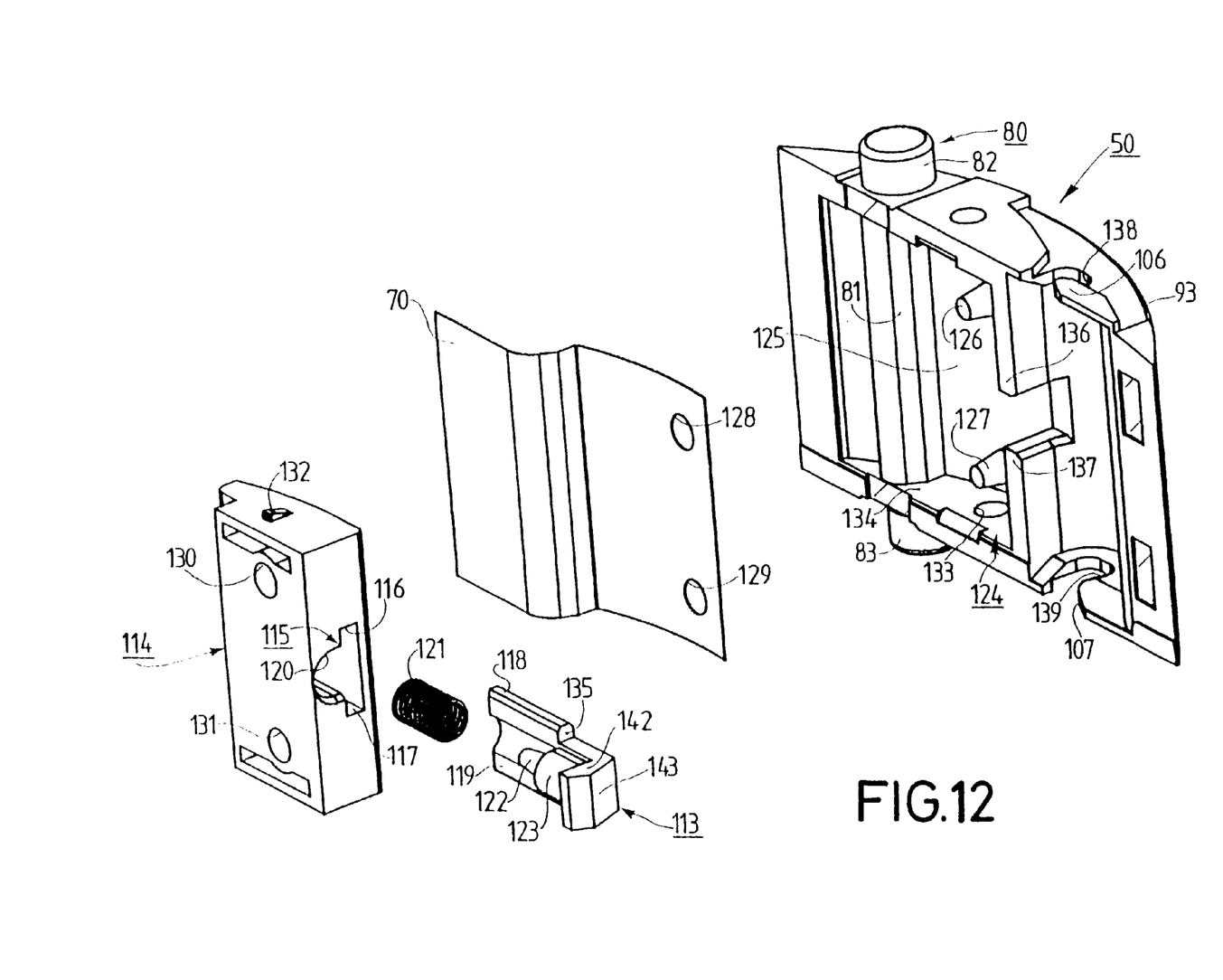
FIG. 12 shows the pull-out element of the pull-out assembly of FIG. 6 in an oblique plan view and in an exploded view.

The pull-out element 50 has been provided with a locking element 113 which is movable with respect to the pull-out element 50 and whose construction is shown in detail in FIG. 12. The retaining means 113 is formed by a movably guided slide. To guide the locking element 113 the pull-out element 50 has an intermediate element 114 having a recess 115 formed with two guide channels 11 and 177 adapted to receive each a respective guide member 118 or 119 which is integral with the locking element 113. The recess 115 further has a partly cylindrical part 120 adapted to receive a helical pressure spring 121 provided as spring means. The pressure spring 121 can be fitted onto a pin 122 of the locking element 113, which pin 122 projects from a partly cylindrical portion 123 of the locking element 113 and which partly cylindrical portion 123 is also engageable in the partly cylindrical part 120 of the recess 115.

The pull-out element 50 has a recess 124 for receiving the intermediate element 114. Two pins 126 and 127 project from a bounding wall 125 of the recess 124. The pull-out tape 70 can first be fitted onto these two pins 126 and 127 with the aid of two holes 128 and 129, after which the intermediate element 114 can also be fitted onto the two pins 126 and 127 with the aid of two holes 130 and 131 but prior to this the pressure spring 121 and the locking element 113 are inserted into the recess 115 and retained during insertion of the intermediate element 113 into the recess 124 of the pull-out element 50. After the complete insertion of the intermediate element 114 into the recess 124 two latching noses 132 on the intermediate element 114, of which only one latching nose 132 is visible in FIG. 12, engage in latching holes 133 formed in a further bounding wall 134 of the recess 124. Only one of the latching holes 133 and only one of the bounding walls 134 is shown in FIG. 12. The intermediate element 114 is securely locked in the pull-out element 50 with the aid of the latching noses 132 and the latching holes 133.

After the intermediate element 114 together with the pressure spring 121 mounted therein and the locking element 113 have been mounted completely into the recess 124 the locking element 113 may be released, upon which the pressure spring 121 urges the locking element 113 in a direction opposite to the direction of insertion of the locking element 113 into the intermediate element 114, as a result of which the locking element 113 engages against two abutment ribs 136 and 137 of the pull-out element 50 with the two end portions 135 of the guide members 118 and 119. Thus, the end portions 135 of the guide members 118 and 119 and the abutment ribs 1136 and 137 define a rest position for the locking element 113, as can be seen in FIG. 8.

In the manner described hereinbefore the locking element 113 is mounted on the pull-out element 50 so as to be movable transversely to the coupling direction 69. With the coupling pin 21 coupled to the pull-out element 50, as is shown in FIGS. 6 and 9, the locking element 113, which is movable with respect to the pull-out element 50, cooperates with a part of the coupling pin 21 in order to hold the pull-out element 50 and the coupling pin 21 together, as is shown in FIGS. 6 and 9. In the present case the locking element 113 is held in such a position on the pull-out element 50 that in operation the locking element 113 cooperates with a central portion 22 of the coupling pin 21. The pressure spring 121 then urges the locking element 113 towards a locking position, shown in FIGS. 6 and 9, for cooperation with the central portion 22 of the coupling pin 21.

The pull-out element 50 has two locking surfaces 138 and 139 which are spaced apart in the axial direction of the coupling pin 21 and which are each engageable behind one of the two end portions 140 and 141 of the central portion 22 of the coupling pin 21. In operation, i.e. in the coupled condition of the pull-out element 50 and the coupling pin 21, the locking element 113, which is loaded by the pressure spring 121, keeps the two end portions 140 and 141 of the central portion 22 of the coupling pin 21 engaged against the two locking surfaces 138 and 139 of the pull-out element 50. The locking surfaces 138 and 139 of the pull-out element 50 have a circular-arc shape adapted to the diameter of the two end portions 140 and 141, i.e. the diameter of the central portion 22 of the coupling pin 21.

As regards the locking element 113, it is to be noted that in the area of its angled end portion 142 which projects from the intermediate element 114 the locking element 113 has a locking surface 143 which is inclined with respect to the direction of movement of the locking element 113 and which is engageable behind the central portion 22 of the coupling pin 21.

The locking element 113, which is movable transversely to the coupling direction 69 and which engages behind the central portion 22 of the coupling pin 21 with its locking surface 143, the two end portions 140 and 141 of the central portion 22 of the coupling pin 21 then being urged against the locking surfaces 138 and 139 which also engage behind the central portion 22 in the area of its two end portions 140 and 141, ensures that the coupling pin 21 is locked to the pull-out element 50 in a stable and reliable manner.

In the device 1 described hereinbefore the latching means 94 are formed by two pivotable latching levers 95 and 96. It is also possible to provide two latching slides instead of two latching levers.

In the device 1 described hereinbefore the locking element 113, which is movable transversely to the coupling direction 69, has been arranged on the pull-out element 50. It is to be noted that in another construction of the pull-out element and coupling element, for example a construction similar to the construction known from the patent document WO 98/44499 A1, the locking element may alternatively be arranged on the coupling element.

What is claimed is:

1. A recording and/or reproducing device (1), into which a cassette (3) can be loaded, which cassette comprises a housing (4) and a rotationally drivable supply reel (19) accommodated in the housing (4) and a record carrier (20) in the form of a tape wound onto the reel hub of the supply reel (19) and a coupling element (21) connected to the record carrier (20) in the area of the free end of the record carrier (20) and held in a coupling position, and which comprises a rotationally drivable take-up reel (45) having a reel hub (47), and which comprises a pull-out element (50) constructed to be coupled to the coupling element (21), and which comprises retaining means (51) constructed to detachably retain the pull-out element (50) and enabling the pull-out element (50) to be retained in an area in which a coupling to the coupling element (21) can be effected and from which the pull-out element (50) is detachable after coupling to the coupling element (21), and which comprises controllable latching means (94) which are movable between a latching position and a release position, in which latching position they can inhibit a disengagement of the pull-out element (50) from the retaining means (51) and in which release position they enable the pull-out element (50) to be detached from the retaining means (51), and which comprises actuating means (70) by which the pull-out element (50), together with the coupling element (21) coupled thereto, can be moved away from the retaining means (51) and up to the reel hub (47) of the take-up reel (45), in order to bring into engagement with one another, on the one hand, the reel hub (47) and, on the other hand, the pull-out element (50) and the coupling element (21) coupled thereto, characterized in that the latching means (94) are constructed and arranged to cooperate with the coupling element (21), and the latching means (94) only assume their latching position when the coupling element (21) is correctly coupled to the pull-out element (50), wherein the retaining means (51) are mounted so as to be movable between a standby position and a coupling position and are movable in a coupling direction from their standby position into their coupling position, and the latching means (94) comprise at least one latching element (95, 96) arranged on the retaining means (51), and the at least one latching element (95, 96) is movable by the coupling element (21) in a direction opposite to the coupling direction (69) from its latching position into its release position, and wherein spring means (98) have been provided, which spring means cooperate with the at least one latching element (95, 96) and which urge the at least one latching element (95, 96) towards its latching position.

2. A recording and/or reproducing device (1) as claimed in claim 1, wherein the coupling element (21) is formed by a substantially cylindrical coupling pin (21) which has two end portions (23, 24) which each project beyond the record carrier (20) in the width direction of the record carrier (20), and the latching means (94) include two latching elements (95, 96) which each cooperate with an end portion (23, 24) of the coupling pin (21) forming the coupling element (21).

3. A recording and/or reproducing device (1) as claimed in claim 2, characterized in that the two latching elements (95, 96) are each formed by a latching lever (95, 96) which is pivotably mounted on the retaining means (51).

4. A recording and/or reproducing device (1) as claimed in claim 3, characterized in that each latching lever (95, 96) has a lever arm (100) which, when the latching lever (95, 96) is in its latching position, faces a latching portion (106, 107) of the pull-out element (50) and thereby blocks a movement of the pull-out element (50).

* * * * *